Aug. 3, 1937.    G. L. ROBERTS    2,089,071
TOMATO JUICE PROCESS
Filed April 1, 1936
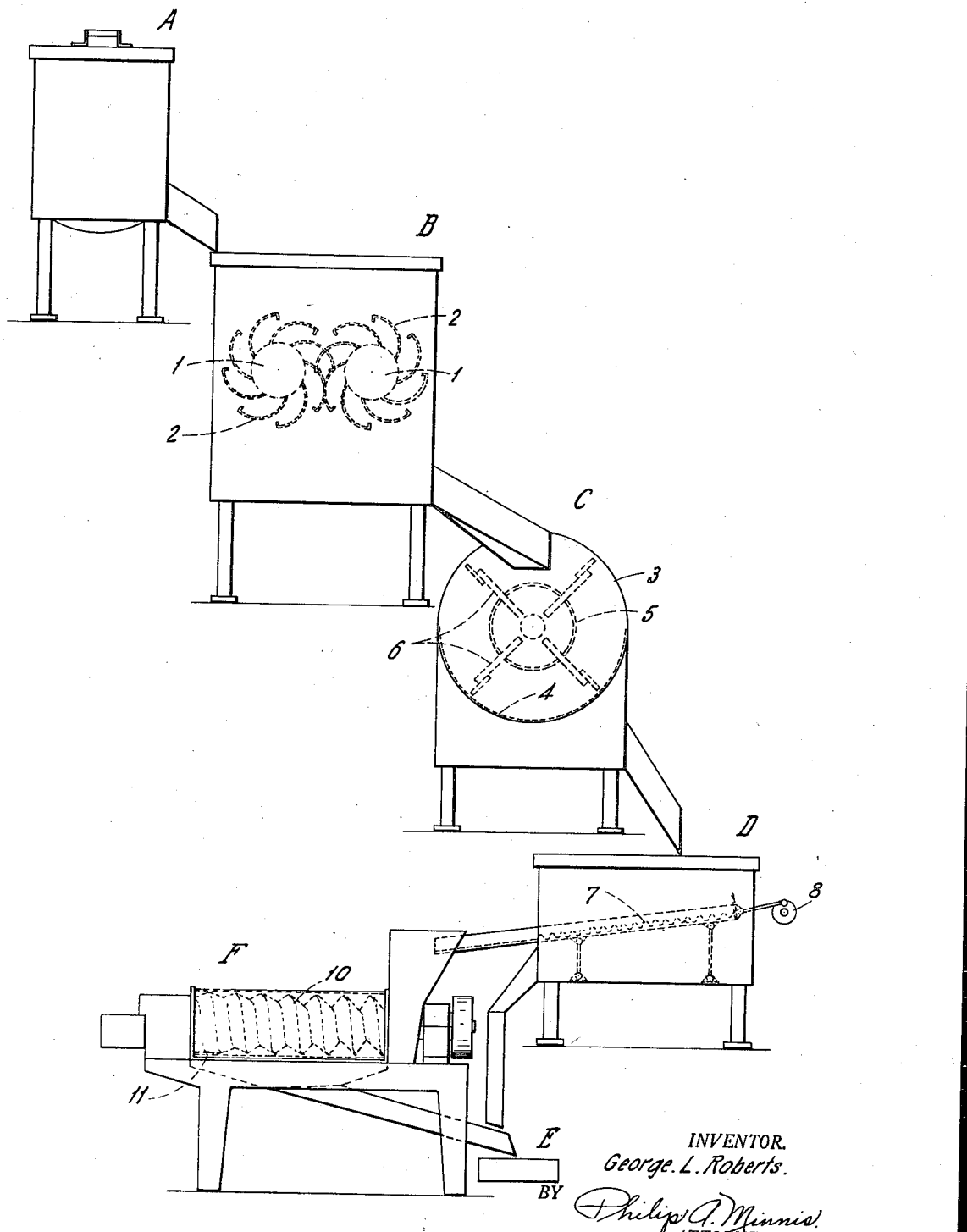
INVENTOR.
George. L. Roberts.
BY
Philip A. Minnie
ATTORNEY.

UNITED STATES PATENT OFFICE 2,089,071

TOMATO JUICE PROCESS

George L. Roberts, San Jose, Calif., assignor to Food Machinery Corporation, San Jose, Calif., a corporation of Delaware Application April 1, 1936, Serial No. 72,025

3 Claims. (Cl. 99—105)

This invention relates to the production of tomato juice and is more specifically concerned with an improved method of preparing a tomato juice product of high quality.

It has been found in prior practice that forcible expression or squeezing of the juice from tomatoes results in a product which is more or less undesirable, because certain constituents thereof settle out upon standing. This objectionable characteristic has heretofore been overcome by employing a method which does not include positive expression or squeezing action, such as that disclosed, for example, in United States Letters Patent No. 1,874,181, issued to W. H. Gavin on August 3, 1932. In following the method of this patent, the tomatoes are first scalded by steaming, then macerated and thereafter subjected to a slow screen wiping effect in a "cyclone" to separate the skins, seeds, stems and the like from a stock which consists of juice and pulp. Subsequently, the juice and pulp stock are subjected to a screen shaking effect during a separation step in which most of the juice and certain parts of the pulp which will remain in suspension are passed through the screen to form the product. The pulp remaining on the screen is discarded as waste.

While tomato juice produced by this method is of a good quality, a substantial amount of juice as well as certain nutritive constituents of the tomatoes remain in the discarded pulp and are therefore wasted. I have discovered, however, that a substantial amount of the juice and nutritive constituents thus hitherto wasted in the discarded pulp, may not only be recovered by subjecting the pulp to a forcible squeezing or pressing operation, but that, contrary to the results obtained when whole tomatoes are so treated, the solid pulp particles entrained in the recovered juice do not settle out, but remain in stable suspension therein.

By utilizing this phenomenon I am enabled to avoid the waste which has heretofore occurred in the prior process referred to, and my method contemplates retaining substantially the same steps as before, namely, the steaming, macerating, cycloning, and screen shaking treatment, but I subject the aggregate stock to further treatment. The further treatment consists in subjecting the pulp remaining after the screen shaking treatment to an expressing or squeezing operation whereby a considerable further amount of juice and certain desirable pulp constituents are extracted from the pulp. This secondary juice is then mixed with the primary or screen juice.

I have found that the resultant product remains homogeneous upon standing, has substantially greater body, has a more whosesome and edible appearance, and has superior nutritive qualities to those possessed by the tomato juice products heretofore produced. In addition, substantially all the juice and the desirable pulp constituents are recovered and form a part of the product.

It is an object of my invention, therefore, to provide an improved method of producing tomato juice in which substantially all of the juice and the desirable pulp constituents are retained in the product.

Another object of the invention is to provide an improved method of producing tomato juice to provide a permanent homogeneous product of good appearance and superior nutritive qualities.

Other objects will appear as the description progresses with reference to the accompanying drawing where I have shown certain conventional machines as they may be employed in carrying out the method of my invention.

Referring to the drawing, the conventional machines which I prefer to employ in carrying out my new method include steamer A in which the tomatoes are scalded at the normal steam pressure of approximately 212° F. to soften them. From the steamer, the scalded tomatoes are delivered to macerator B comprising rotatable rolls 1 provided with a curved overlapping or interlacing teeth 2. Macerator B operates to tear the tomatoes into a pulpy condition suitable for delivery to the first separation device which comprises "cyclone" C. Cyclone C may include cylinder 3 with a screen bottom 4 and in which rotatable reel 5 having blades 6 is mounted. Preferably, blades 6 are rotated relatively slowly, for example at approximately 290 R. P. M., and operate to wipe the tomato stock therein against screen 4 through which the juice and pulp passes while undesirable constituents such as the skin, seeds, stems and fibers remain in the cyclone.

From cyclone C a tomato stock comprising juice and pulp is delivered to shaker screen D which includes screen 7 mounted at a slight angle to the horizontal by suitable movable supports and given longitudinal vibration from eccentric 8. Screen 7 may be provided in a mesh between 40 and 120 to the inch and preferably the mesh is selected within the narrower range of from 60 to 80 to the inch. By virtue of the screen shaking effect to which the stock on screen 7 is subjected, the juice and a certain part of the pulp passes through screen 7 while a residue stock comprised principally of pulp incapable of passing through screen 7 and some juice remains on the screen.

From the shaker screen D, the primary tomato juice stock which passes through screen 7 is delivered to receptacle E, while the residue stock which is retained by screen 7 is delivered to screw press F which comprises screw 10 having a screen 11 cooperating therewith. The action of screw press F is to subject such residue stock to a screen pressing effect to express substantially all of the juice from the stock placed therein together with certain constituents of the pulp which will pass through the screen. Screen 11 may be a perforated metal sheet, the perforations being preferably of a diameter of from .03 to .04 inch. The juice and pulp constituents which pass through screen 11 comprise a secondary tomato juice stock which is also delivered to receptacle E and mixed with the primary stock received therein from shaker screen D to form the final tomato juice product.

From the above description it will be seen that the improved method which I have provided and which consists in modifying the prior method by reworking certain pulp stock of the tomatoes and by adding the tomato juice stock so retrieved to the original stock of tomato juice, enables the recovery of substantially all of the available tomato juice and also substantially all of certain natural constituents which are desirable in the finished tomato juice stock. In practicing my improved method, I have found that such method not only provides for the recovering of additional tomato stock as noted above, but that the final tomato juice stock provided thereby will retain its homogeneous character, will be of high nutritive content and present a wholesome and edible appearance.

While I have described my invention in connection with certain preferred steps, and as carried out by certain conventional machines, it is to be understood that the invention is capable of variation, and may also be carried out by the use of other conventional devices. The scope of my invention, therefore, is to be limited only by the scope of the appended claims.

I, therefore, claim as my invention:

1. The method of producing tomato juice, which comprises separating a juice and pulp stock from other constituents of tomatoes, then subjecting such juice and pulp stock to a screen shaking effect to recover a primary tomato juice stock, thereafter subjecting the residue juice and pulp stock to a second separating operation to recover a secondary tomato juice stock therefrom, and mixing said primary and secondary stocks.

2. The method of producing tomato juice which comprises subjecting macerated tomato stock to a screen wiping effect to recover a juice and pulp stock, then subjecting said juice and pulp stock to a screen shaking effect to recover a primary tomato juice stock, then subjecting the residue juice and pulp stock to a screen pressing effect to recover a secondary tomato juice stock, and then mixing said primary and secondary stocks.

3. The method of producing tomato juice which comprises softening the fruit by steaming, then macerating the fruit to a pulpy condition, then subjecting macerated tomato stock to a screen wiping effect to recover a juice and pulp stock, then subjecting said juice and pulp stock to a screen shaking effect to recover a primary tomato juice stock, then subjecting the residue juice and pulp stock to a screen pressing effect to recover a secondary tomato juice stock, and then mixing said primary and secondary stocks.

GEORGE L. ROBERTS.